(12) United States Patent
Skillman

(10) Patent No.: US 8,607,134 B2
(45) Date of Patent: Dec. 10, 2013

(54) DYNAMICALLY MANIPULATING CONTENT TO FORCE WEB BROWSERS TO OPEN MORE CONNECTIONS

(75) Inventor: DJ Skillman, Redwood City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 395 days.

(21) Appl. No.: 13/078,721

(22) Filed: Apr. 1, 2011

(65) Prior Publication Data

US 2011/0185270 A1    Jul. 28, 2011

Related U.S. Application Data

(63) Continuation of application No. 11/456,725, filed on Jul. 11, 2006, now Pat. No. 7,941,741.

(51) Int. Cl.
*G06F 17/00* (2006.01)

(52) U.S. Cl.
USPC .......................................................... 715/205

(58) Field of Classification Search
USPC .................................... 715/205, 20, 255, 271
See application file for complete search history.

(56) References Cited

U.S. PATENT DOCUMENTS

| | | | |
|---|---|---|---|
| 5,923,850 A * | 7/1999 | Barroux ........................ | 709/224 |
| 6,160,804 A * | 12/2000 | Ahmed et al. ................ | 370/349 |
| 6,311,197 B2 | 10/2001 | Mighdoll et al. | |
| 6,321,242 B1 | 11/2001 | Fogg et al. | |
| 6,578,066 B1 | 6/2003 | Logan et al. | |
| 6,775,235 B2 | 8/2004 | Datta et al. | |
| 6,871,213 B1 | 3/2005 | Graham et al. | |
| 6,922,761 B2 | 7/2005 | O'Connell et al. | |
| 6,970,888 B1 | 11/2005 | Sciarra | |
| 7,082,476 B1 | 7/2006 | Cohen et al. | |
| 7,168,094 B1 | 1/2007 | Fredell | |
| 7,219,299 B2 | 5/2007 | Fields et al. | |
| 7,284,056 B2 | 10/2007 | Ramig | |
| 7,406,498 B2 | 7/2008 | Reshef et al. | |
| 7,492,787 B2 | 2/2009 | Ji et al. | |
| 7,668,954 B1 | 2/2010 | Melvin | |
| 7,702,521 B2 | 4/2010 | Bascom | |
| 8,041,753 B2 * | 10/2011 | Carro ............................ | 707/822 |
| 8,176,430 B1 * | 5/2012 | Cahill .......................... | 715/760 |
| 2001/0018697 A1 * | 8/2001 | Kunitake et al. ............. | 707/517 |
| 2002/0152293 A1 * | 10/2002 | Hahn et al. .................... | 709/223 |
| 2002/0194382 A1 | 12/2002 | Kausik et al. | |
| 2003/0014441 A1 * | 1/2003 | Suzuki et al. ................. | 707/513 |
| 2003/0105830 A1 | 6/2003 | Pham et al. | |
| 2003/0191822 A1 * | 10/2003 | Leighton et al. ............. | 709/219 |
| 2003/0225859 A1 | 12/2003 | Radia et al. | |

(Continued)

OTHER PUBLICATIONS

Co-pending U.S. Appl. No. 11/456,725, filed Jul. 11, 2006 entitled "Dynamically Manipulating Content to Force Web Browsers to Open More Connections" by DJ Skillman, 40 pages.

(Continued)

*Primary Examiner* — Laurie Ries
(74) *Attorney, Agent, or Firm* — Harrity & Harrity, LLP

(57) ABSTRACT

A system may identify a group of first links in a document, where the first links correspond to a group of objects within the document and are associated with a same identifier. The system may replace the first links in the document with second links that point to a number of different identifiers, and forward the document with the second links to a client.

20 Claims, 14 Drawing Sheets

(56) References Cited

U.S. PATENT DOCUMENTS

| | | |
|---|---|---|
| 2005/0162422 A1 | 7/2005 | Miyata |
| 2005/0177595 A1 | 8/2005 | Krieg et al. |
| 2005/0251736 A1* | 11/2005 | Ran et al. ............... 715/513 |
| 2006/0041830 A1 | 2/2006 | Bohn |
| 2007/0016848 A1 | 1/2007 | Rosenoff et al. |
| 2009/0049120 A1 | 2/2009 | Sakairi et al. |

OTHER PUBLICATIONS

Ashman, "Electronic Document Addressing: Dealing With Change," Computing Surveys (CSUR), vol. 32, Issue 3, Sep. 2000, pp. 201-212.

Chakrabarti, "Integrating the Document Object Model With Hyperlinks for Enhanced Topic Distillation and Information Extraction," Proceedings of the 10$^{th}$ International Conference on World Wide Web, ACM, Apr. 2001, pp. 211-220.

Gentilcore, "Firefox—Performance and Network Tweaks for Firefox," http://fasterfox.mozdev.org, 2005, 11 pages.

IEBlog: Internet Explorer and Connection Limits; http://blogs.msdn.com; Apr. 11, 2005; 1 page.

WinInet limits connections per server; http://support.microsoft.com; Jan. 23, 2006; 2 pages.

Fielding et al.; Hypertext Transfer Protocol—HTTP/1.1; Network Working Group; Request for Comments 2616; Jun. 1999; pp. 1-114.

* cited by examiner

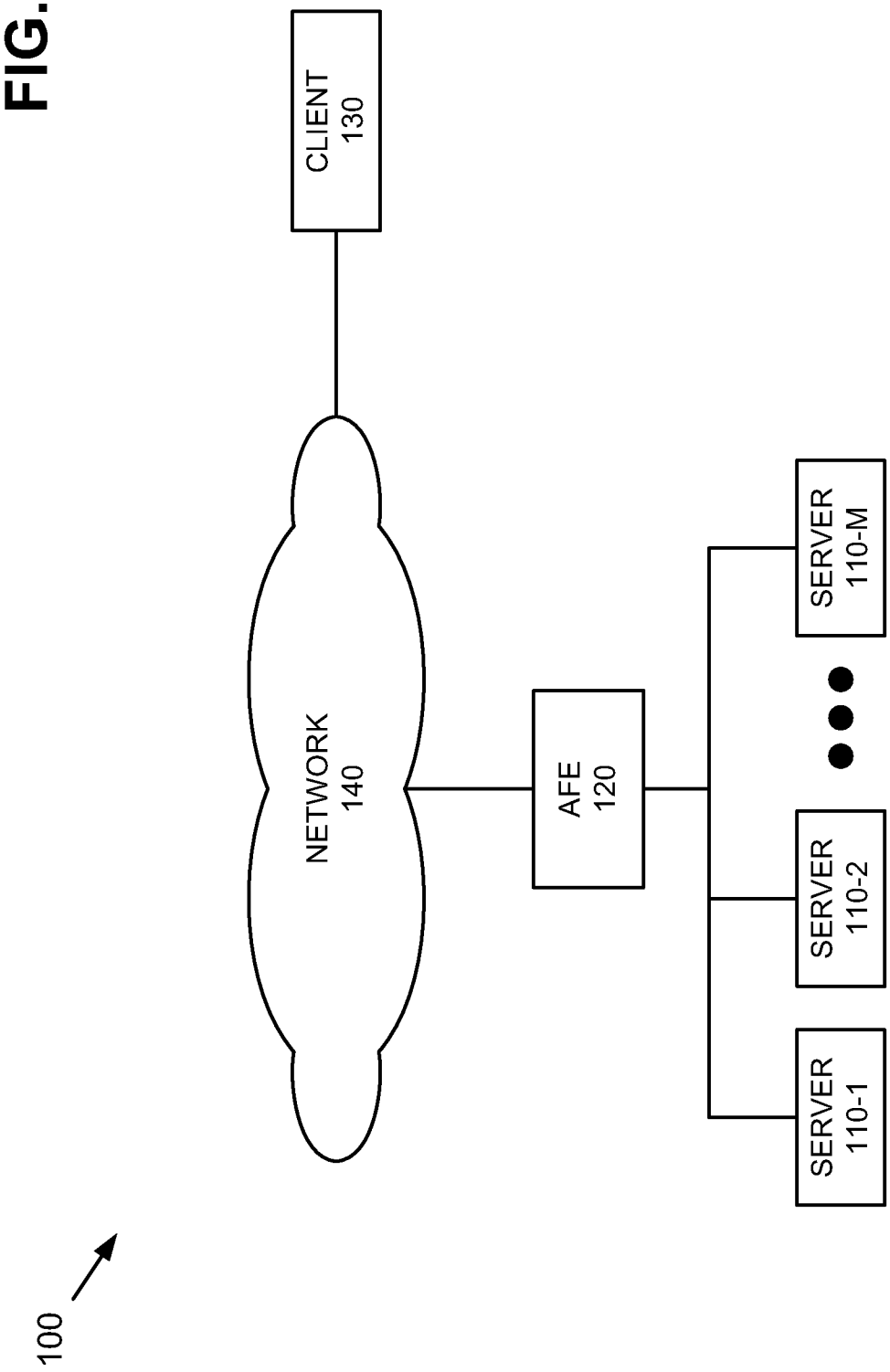

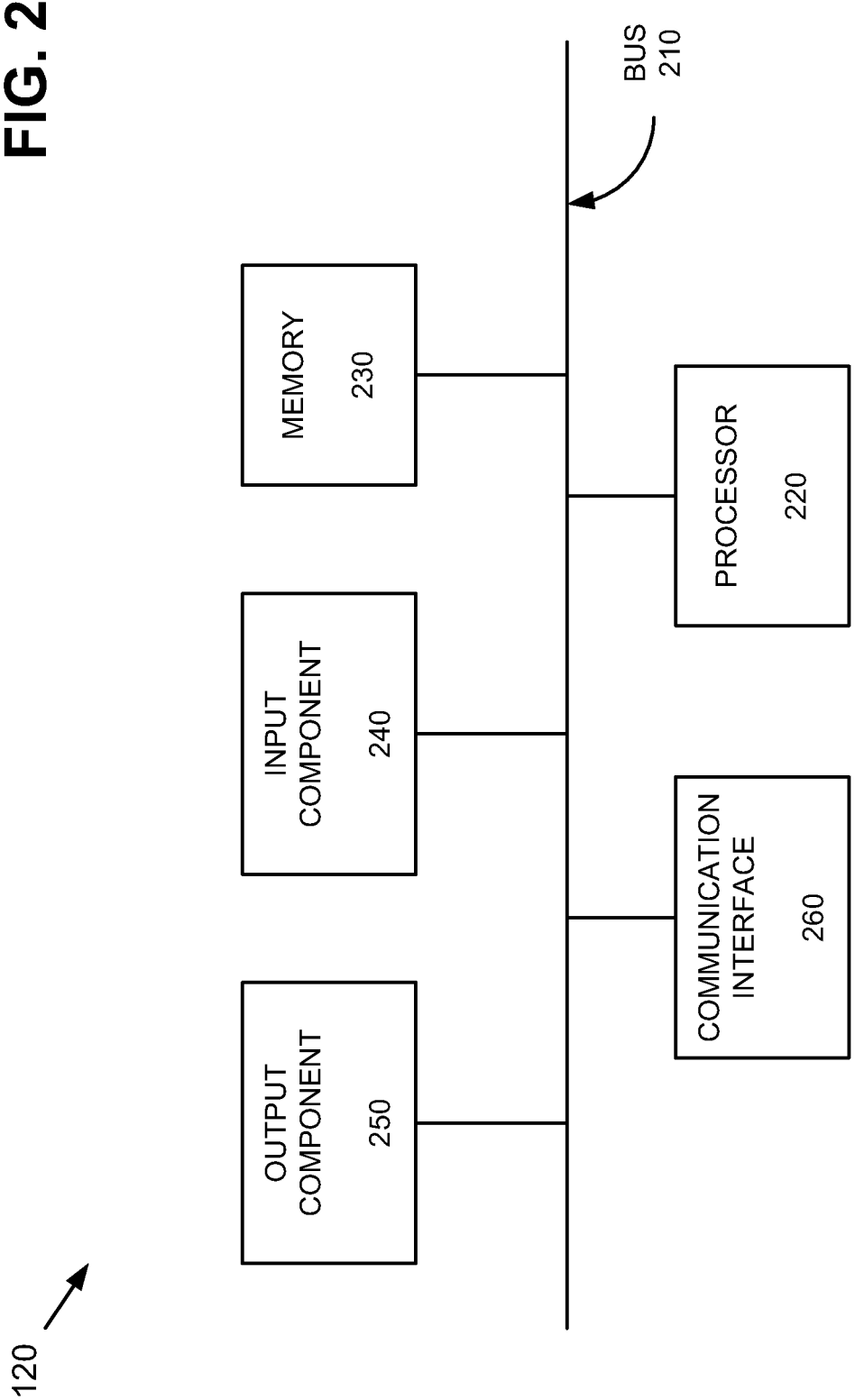

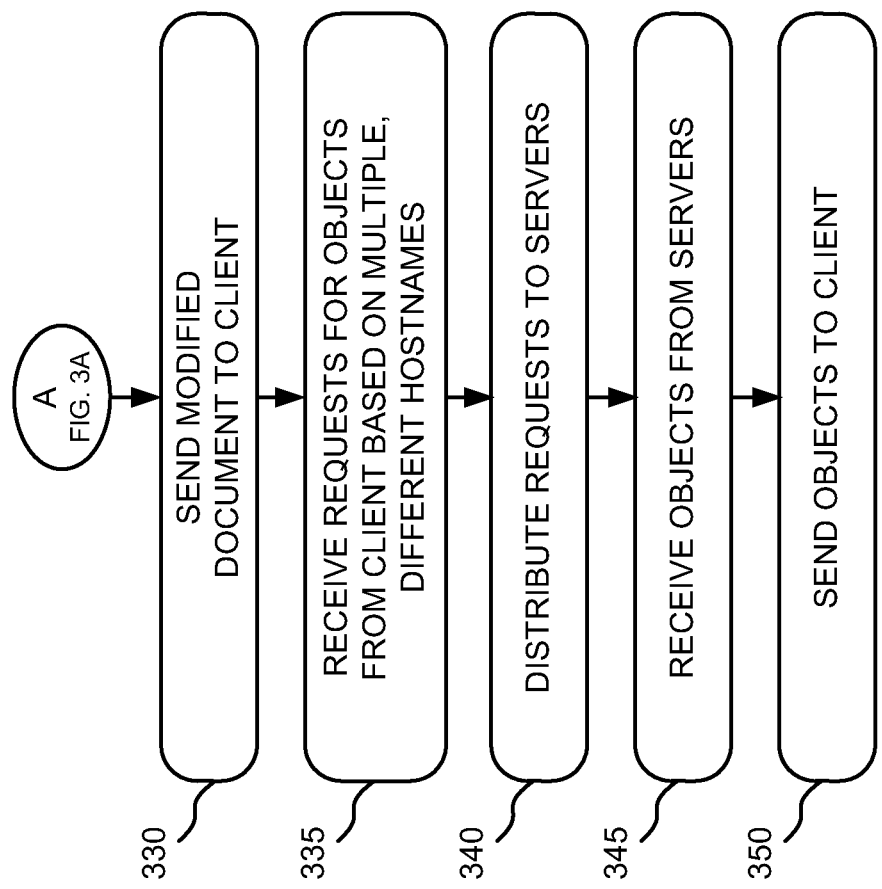

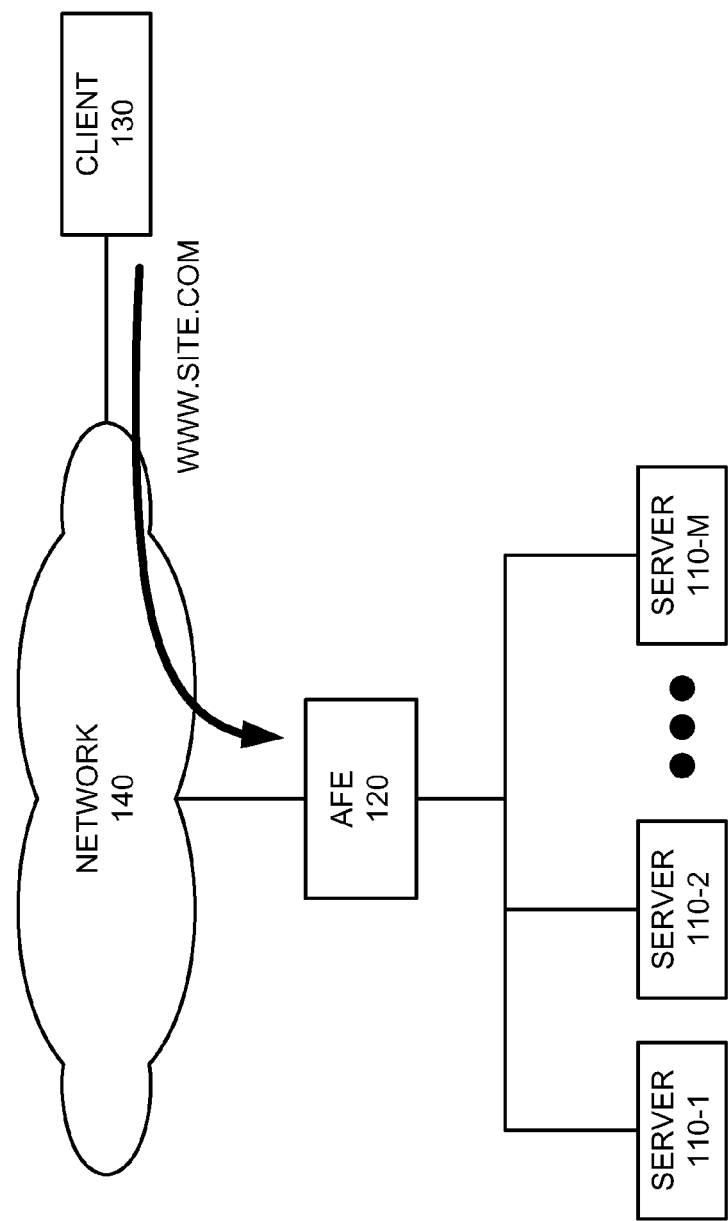

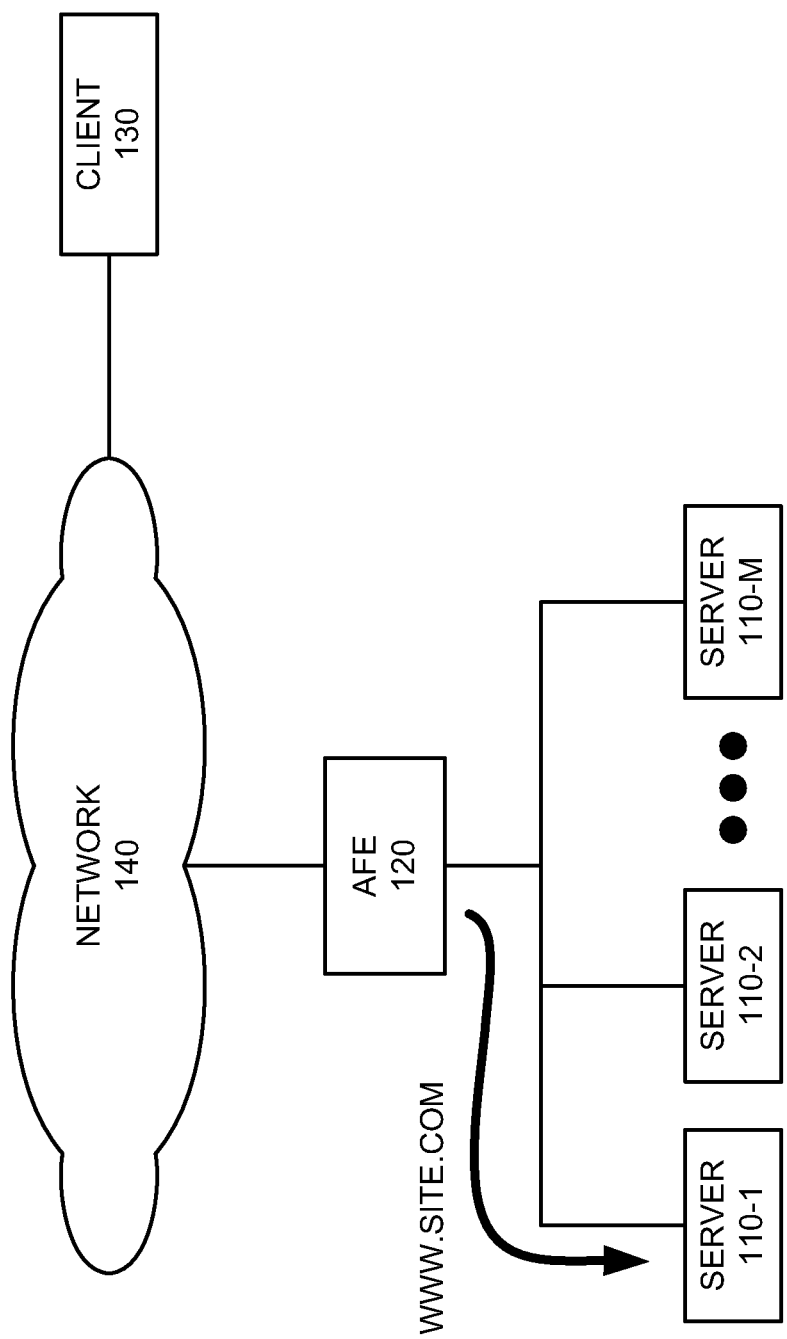

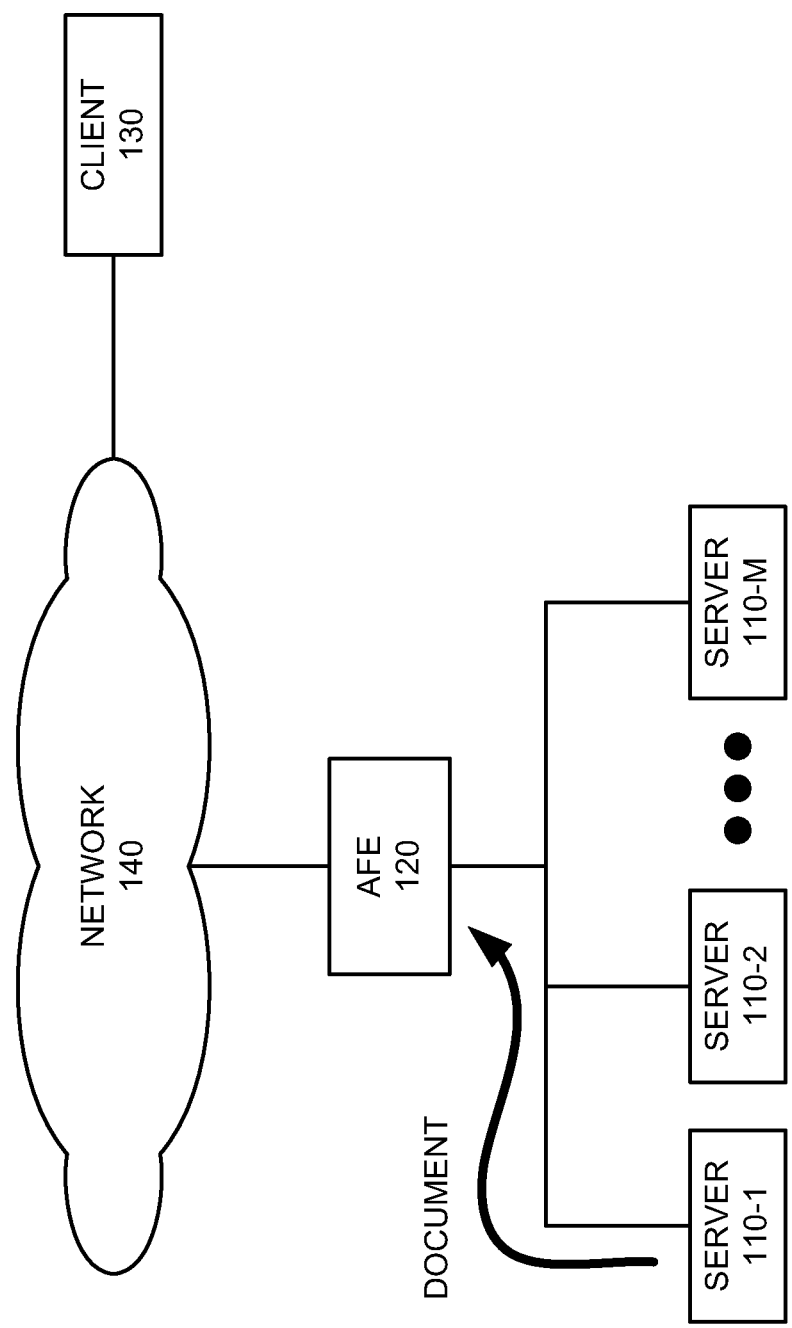

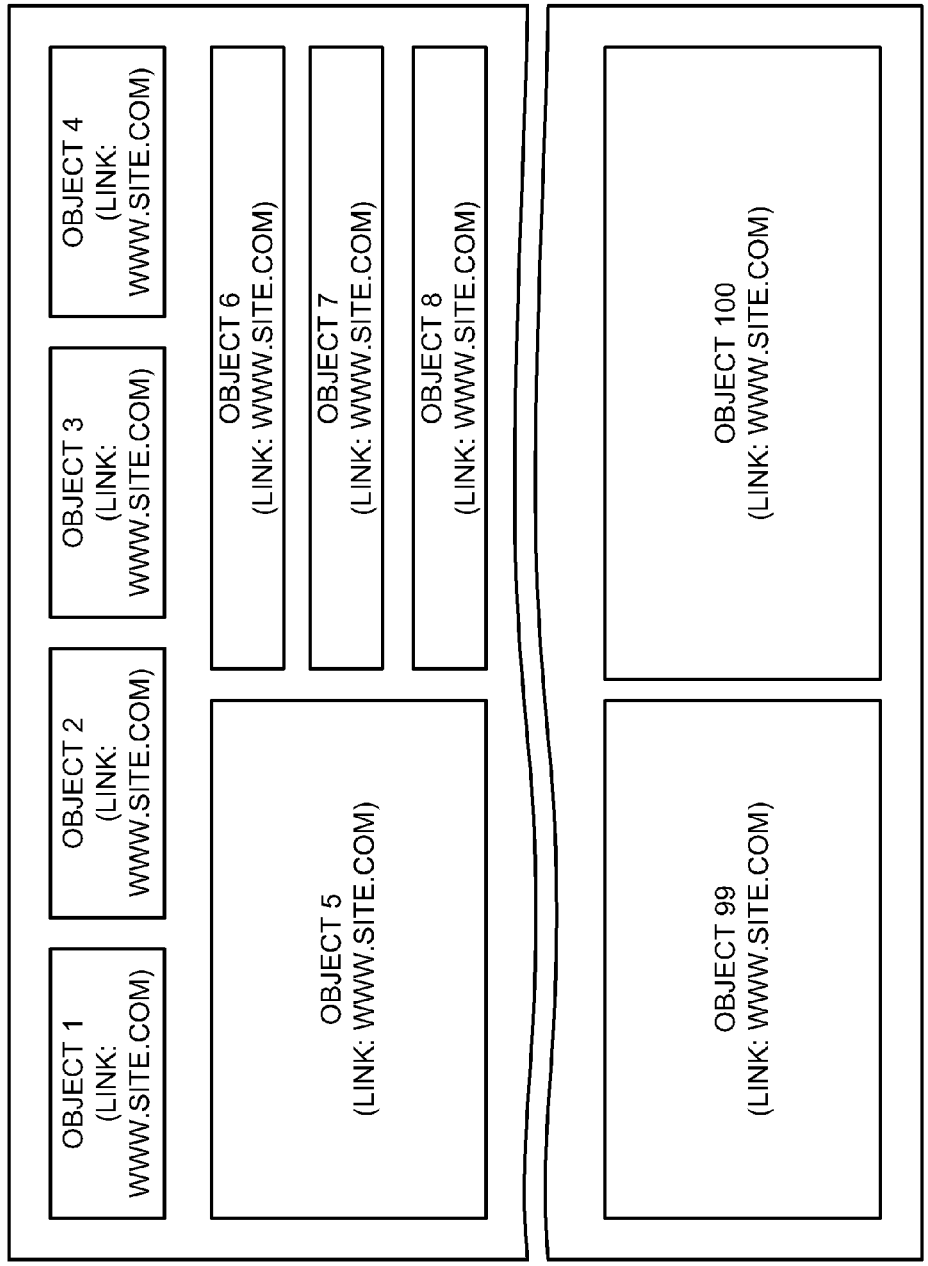

DYNAMICALLY MANIPULATING CONTENT TO FORCE WEB BROWSERS TO OPEN MORE CONNECTIONS

RELATED APPLICATION

This application is a continuation of U.S. patent application Ser. No. 11/456,725, filed Jul. 11, 2006, which is incorporated herein by reference.

BACKGROUND

1. Field of the Invention

Implementations described herein relate generally to data communication and, more particularly, to communication between a client and a server.

2. Description of Related Art

The Hypertext Transfer Protocol (HTTP) is a sessionless and stateless protocol that runs over Transmission Control Protocol (TCP) connections. HTTP is a serial process, such that over any one TCP connection, only one object of a web page can download at a time. Web browsers, such as Internet Explorer, normally open no more than two TCP connections to a web server. Many web pages have dozens, if not hundreds, of objects that can only be downloaded two at a time (i.e., one over each of the two TCP connections). Over high latency links, it can take minutes to download all of the objects of a web page. Sometimes, a web browser can issue several requests for the objects of a web page and time out before all of the objects are downloaded since the objects download at a maximum rate of one at a time over each of the two TCP connections.

SUMMARY

According to one aspect, a method may include receiving a document that includes a group of first links for a corresponding group of objects within the document, each of the first links being associated with a same hostname; automatically modifying the first links in the document to second links that point to a number of different hostnames; and transmitting the document with the second links to a client.

According to another aspect, a system may include means for receiving a document that includes a group of first links, associated with a particular hostname, for a corresponding group of objects within the document; means for identifying a number of different hostnames; means for modifying the first links in the document to second links associated with the number of different hostnames; and means for transmitting the document with the second links to a client.

According to yet another aspect, a device may include logic to identify a group of first links in a document, the first links corresponding to a group of objects within the document and being associated with a same hostname; logic to replace the first links in the document with second links that point to a number of different hostnames; and logic to forward the document with the second links to a client.

According to a further aspect, a method, performed by a device, may include receiving a document that includes a group of first links for a corresponding group of objects within the document, each of the first links corresponding to a same identifier; automatically modifying the first links in the document to a group of second links that point to a number of different identifiers, each of the different identifiers resolving to the device; and transmitting the document with the second links to a client.

According to another aspect, a device may include logic to identify a number of first links in a document, where the first links may correspond to a number of objects within the document and may be associated with a same hostname. The device may also include logic to replace the first links in the document with second links associated with a number of different addresses, and logic to forward the document with the second links to a client.

According to a further aspect, a device may include logic to identify a number of first links in a document, where the first links may correspond to a number of objects within the document and may be associated with a same hostname. The device may also include logic to replace the first links in the document with second links associated with a number of different port numbers, and logic to forward the document with the second links to a client.

BRIEF DESCRIPTION OF THE DRAWINGS

The accompanying drawings, which are incorporated in and constitute a part of this specification, illustrate one or more embodiments consistent with the principles of the invention and, together with the description, explain aspects of the invention. In the drawings, FIG. 1 is an exemplary diagram of a network in which systems and methods described herein may be implemented;

FIG. 2 is an exemplary block diagram of an application front end of FIG. 1;

FIGS. 3A and 3B are flowcharts of exemplary processing for dynamically modifying links; and FIGS. 4-13 are diagrams illustrating an exemplary implementation.

DETAILED DESCRIPTION

Figure 3A:
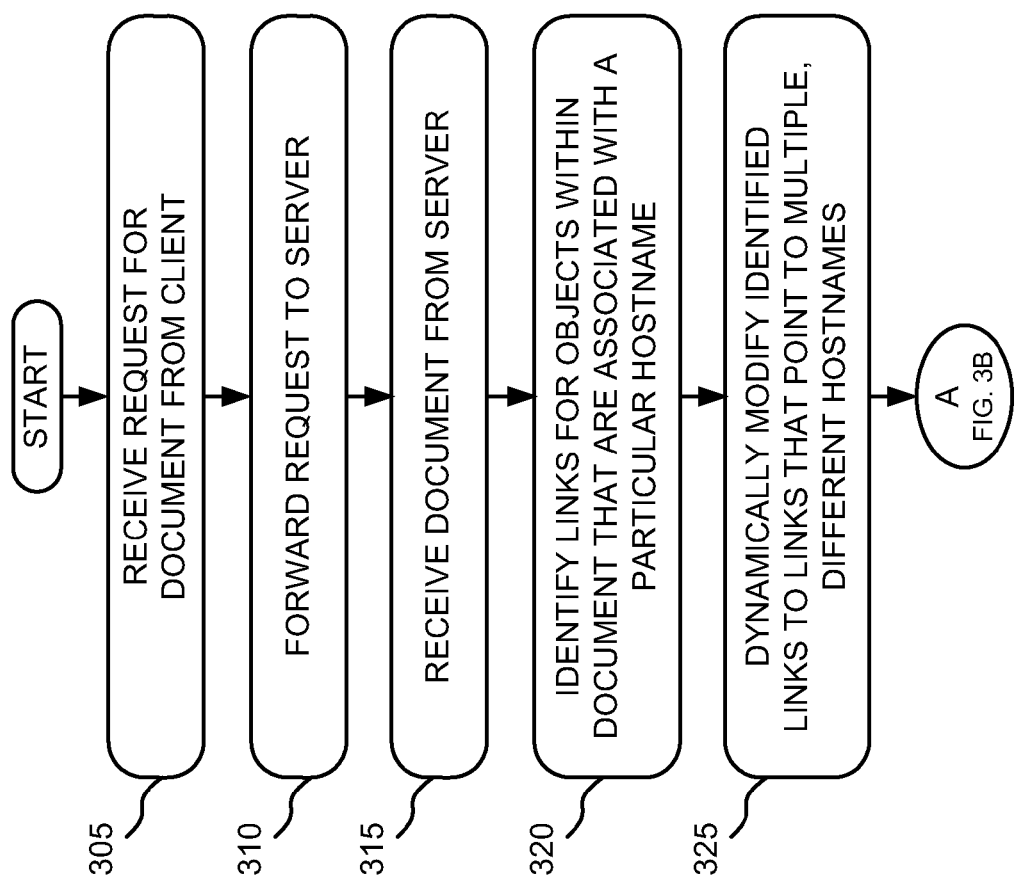

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein may automatically modify links in a document that are associated with a particular identifier to links that point to multiple, different identifiers. As a result, a browser on a client may open additional connections (e.g., TCP connections) to download objects associated with these links.

An "identifier," as used herein, may refer to a hostname, an address (e.g., an Internet Protocol (IP) address), a port number (e.g., a TCP port number), another type of data to identify a network device or a port of a network device, or a combination of this information. An "object," as used herein, may refer to any type of resource that may be needed to render a document, such as text, an image, a video clip or stream, an audio clip or stream, programming code (e.g., Javascript), or another type of content. A "document," as used herein, may refer to any computer-readable and/or computer-storable work product. A common form of document found on the Internet is a web page.

In the description to follow, an identifier will be described in terms of a hostname. It should be understood, however, that the description equally applies to other types of identifiers, such as addresses, port numbers, etc. In the context of hostnames, implementations described herein may automatically modify links in a document that are associated with a particular hostname to links that point to multiple, different hostnames. As a result, a browser on a client may open additional connections (e.g., TCP connections) to download objects associated with these links.

Exemplary Network

FIG. 1 is an exemplary diagram of a network 100 in which systems and methods described herein may be implemented. Network 100 may include servers 110-1, 110-2, ..., 110-M (where M≥2) (collectively referred to herein as "servers 110"), an application front end (AFE) 120, a client 130, and a network 140. A particular number and arrangement of devices are shown in FIG. 1. In practice, there may be more or fewer devices or a different arrangement of devices. Further, while FIG. 1 shows servers 110 and AFE 120 co-located, one or more of these devices may be remotely located.

Servers 110 may include devices that provide information and/or services to locally or remotely connected client devices. In one exemplary implementation, a server 110 may include a web server that serves web content and/or services. In another exemplary implementation, a server 110 may include a corporate server that hosts or manages content for a corporate network. Servers 110 may be associated with a same entity, such as a same company. Servers 110 may appear to client 130 as a single server 110. In other words, client 130 may be unaware of how many servers 110 operate behind AFE 120.

AFE 120 may include a device that operates as an interface for servers 110. For example, AFE 120 may process requests intended for servers 110 and responses from servers 110. In one implementation, AFE 120 may perform multiplexing functions on the server side and demultiplexing functions on the network side. For example, AFE 120 may receive communication via a large number of connections (possibly numbering in the thousands or even hundreds of thousands) on the network side and multiplex the communication over a relatively small number of connections on the server side. AFE 120 may receive communication via the small number of connections on the server side and demultiplex the communication over the large number of connections on the network side.

AFE 120 may also provide various services to improve the operation of servers 110. For example, AFE 120 may take over CPU-intensive tasks from servers 110. Other exemplary services that may be provided by AFEs 120 might include server load balancing, server monitoring, acceleration, scaling and high availability features, and/or global server load balancing. Server load balancing might include balancing the load on servers 110 (e.g., distributing the number of requests given to servers 110). Server monitoring might include periodic health checks on servers 110 to assure that a server 110 is functioning properly before sending a request to it. Acceleration might include techniques to provide efficient access to servers 110, such as multiplexing requests, compression, caching of server content, and/or keeping client connections alive. While a single AFE 120 is shown in FIG. 1, multiple AFEs 120 may be connected between servers 110 and network 140 for increased performance. The scaling and high availability features might include techniques to enable multiple AFEs 120 to function together as a single device. When one or more of servers 110 are remotely located, global server load balancing might permit client devices to connect to servers 110 best equipped to fulfill their requests, regardless of the location of servers 110.

As described below, AFE 120 may dynamically change links in a document that are associated with a particular hostname to links that point to multiple, different hostnames. Each link that points to a different hostname may cause client 130 to open two additional connections (e.g., TCP connections) to download objects associated with the document.

Client 130 may include a device that can request information and/or services from a server 110. Client 130 may include any type of computation or communication device, such as a personal computer, a lap top, a telephone device (cordless, wireline, cellular), a personal digital assistant (PDA), or another type of device. Client 130 may use browser software, for example, to interface to network 140.

Network 140 may include a wide area network (WAN) (e.g., the Internet), a local area network, a telephone network (e.g., the Public Switched Telephone Network (PSTN)), an intranet, or a combination of networks. Communication among servers 110, AFE 120, client 130, and network 140 may be accomplished via wired, wireless, and/or optical communication connections.

Exemplary AFE Configuration

FIG. 2 is an exemplary block diagram of AFE 120. As shown in FIG. 2, AFE 120 may include a bus 210, a processor 220, a memory 230, an input component 240, an output component 250, and a communication interface 260. Bus 210 may include a path that permits communication among the elements of AFE 120.

Processor 220 may include a processor, microprocessor, or processing logic that may interpret and execute instructions. Memory 230 may include a random access memory (RAM) or another type of dynamic storage device that may store information and instructions for execution by processor 220; a read only memory (ROM) device or another type of static storage device that may store static information and instructions for use by processor 220; and/or a magnetic and/or optical recording medium and its corresponding drive.

Input component 240 may include a mechanism that permits an operator to input information to AFE 120, such as a web browser or command line interface, or a control button or switch. Output component 250 may include a mechanism that outputs information to the operator, such as an LED or some form of display. Communication interface 260 may include any transceiver-like mechanism(s) that enables AFE 120 to communicate with other devices and/or systems.

AFE 120 may perform certain operations, as described in detail below. AFE 120 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Exemplary Processing

FIGS. 3A and 3B are flowcharts of exemplary processing for dynamically modifying links. The processing described with regard to FIGS. 3A and 3B may be performed by AFE 120. In another implementation, some or all of the processing may be performed by another device, or a set of devices, either in conjunction with or apart from AFE 120. FIGS. 4-13 are diagrams illustrating an exemplary implementation.

Processing may begin with a request for a document being received from client 130 (block 305) (FIG. 3A). As shown in FIG. 4, assume that client 130 issues a request for a document at the web site www.site.com. The request may be received by network 140. A domain name server (DNS) lookup may occur to translate the hostname www.site.com into a corresponding network address (e.g., IP address). A DNS server (not shown) connected to network 140 may perform the DNS lookup so that the request from client 130 can be appropriately routed through network 140. In this case, assume that the DNS lookup results in a network address for AFE 120.

The received request may be forwarded to a server 110 (block 310). For example, AFE 120 may analyze the request to identify the request as a request for servers 110. AFE 120 may contain a mapping of hostnames to servers. Assume that AFE 120 maps the hostname www.site.com to the set of servers including servers 110. AFE 120 may forward the request to one of servers 110, as shown in FIG. 5. For example, AFE 120 may be configured to send all requests to a particular one of servers 110, distribute requests based on some rule, or use some other criteria to determine how to forward requests.

Server 110 may process the request and send a document to AFE 120, as shown in FIG. 6. The document may be received from server 110 and links for objects within the document that are associated with a particular hostname may be identified (blocks 315 and 320). For example, AFE 120 may parse the document (e.g., any code or text representation of the document, such as Hypertext Markup Language (HTML) code, American Standard Code for Information Interchange (ASCII) code, or another type of code or text) to identify the links within the document that are associated with a particular hostname. In one implementation, AFE 120 may identify the relative links within the document. As shown in FIG. 7, assume that the document includes one hundred objects (e.g., object 1, object 2, . . . , object 100) that have corresponding links that are associated with the hostname www.site.com.

The identified links in the document may be dynamically modified to links that point to multiple, different hostnames (block 325). For example, AFE 120 may replace one of the identified links with a link that points to one of a set of different hostnames. In one implementation, AFE 120 may assign the different hostnames in a round robin fashion. The particular number of different hostnames in the set of hostnames may be configurable. For example, the number of hostnames may be set by an operator or specified by a customer (e.g., an entity associated with at least a portion of the content of servers 110). In another implementation, the number of connections that are desired to be opened may be specified, and the number of different hostnames may be determined based on the desired number of connections (assuming that one hostname equals two connections).

Figure 8:
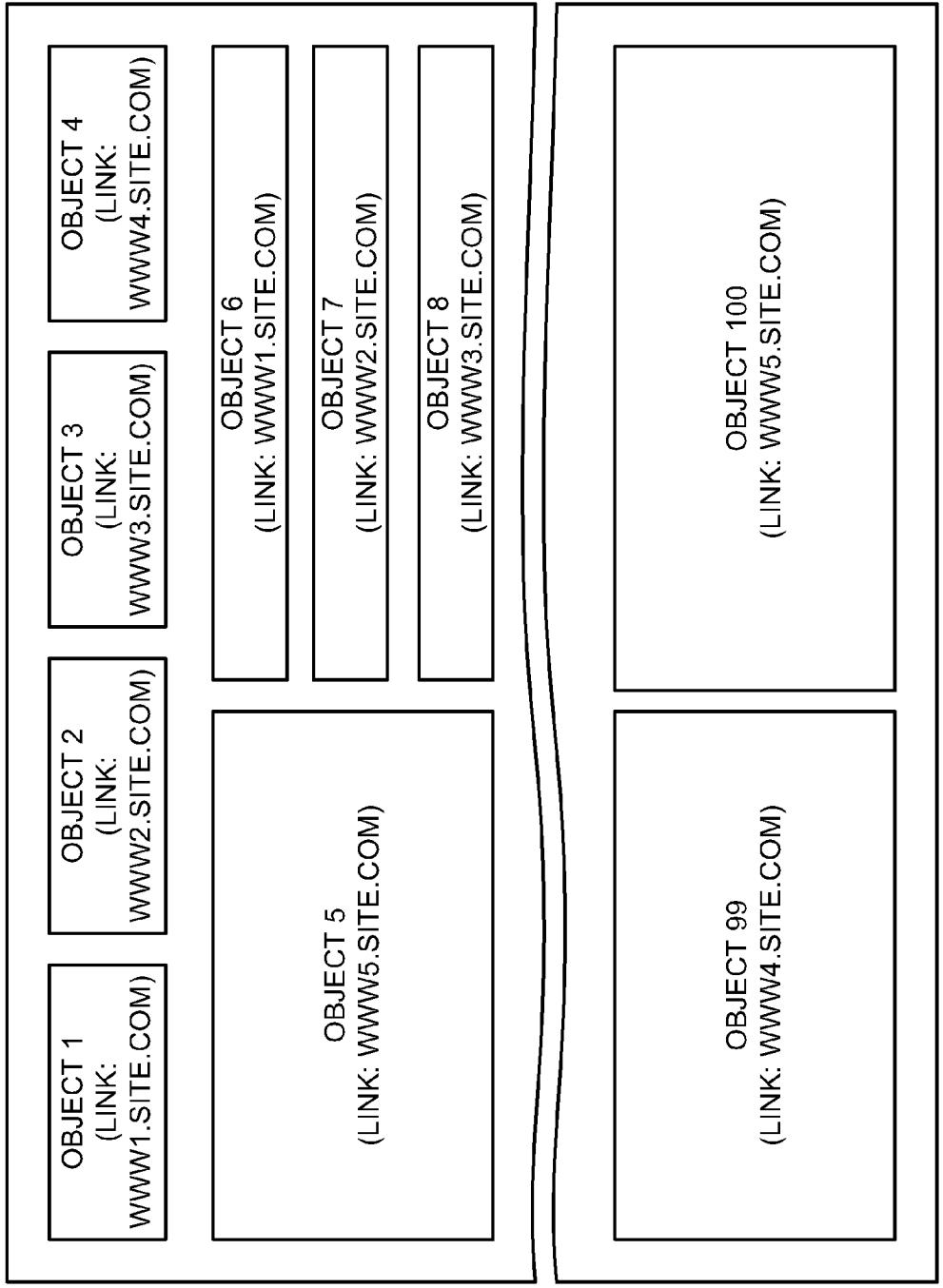

As shown in FIG. 8, assume that the set of hostnames includes five hostnames: www1.site.com, www2.site.com, www3.site.com, www4.site.com, and www5.site.com. In one implementation, AFE 120 may use a set of rules to modify the identified links. One exemplary rule might include:

---
content contains "src=\"/" then
   replace content term "src=\"http://www1.site.com/"
"src=\"http://www2.site.com/" "src=\"http://www3.site.com/"
"src=\"http://www4.site.com/" "src=\"http://www5.site.com/"

---

In this case, AFE 120 may replace the identified links (in this case, relative links) with links associated with the five hostnames in a round robin fashion. For example, as shown in FIG. 8, the link for object 1 may be modified to a link that points to www1.site.com; the link for object 2 may be modified to a link that points to www2.site.com; the link for object 3 may be modified to a link that points to www3.site.com; . . . ; and the link for object 100 may be modified to a link that points to www5.site.com. It may take less than a millisecond (e.g., on the order of a tenth or a hundredth of a microsecond) for AFE 120 to perform the replacing of the identified links with the links that point to the different hostnames.

Figure 9:
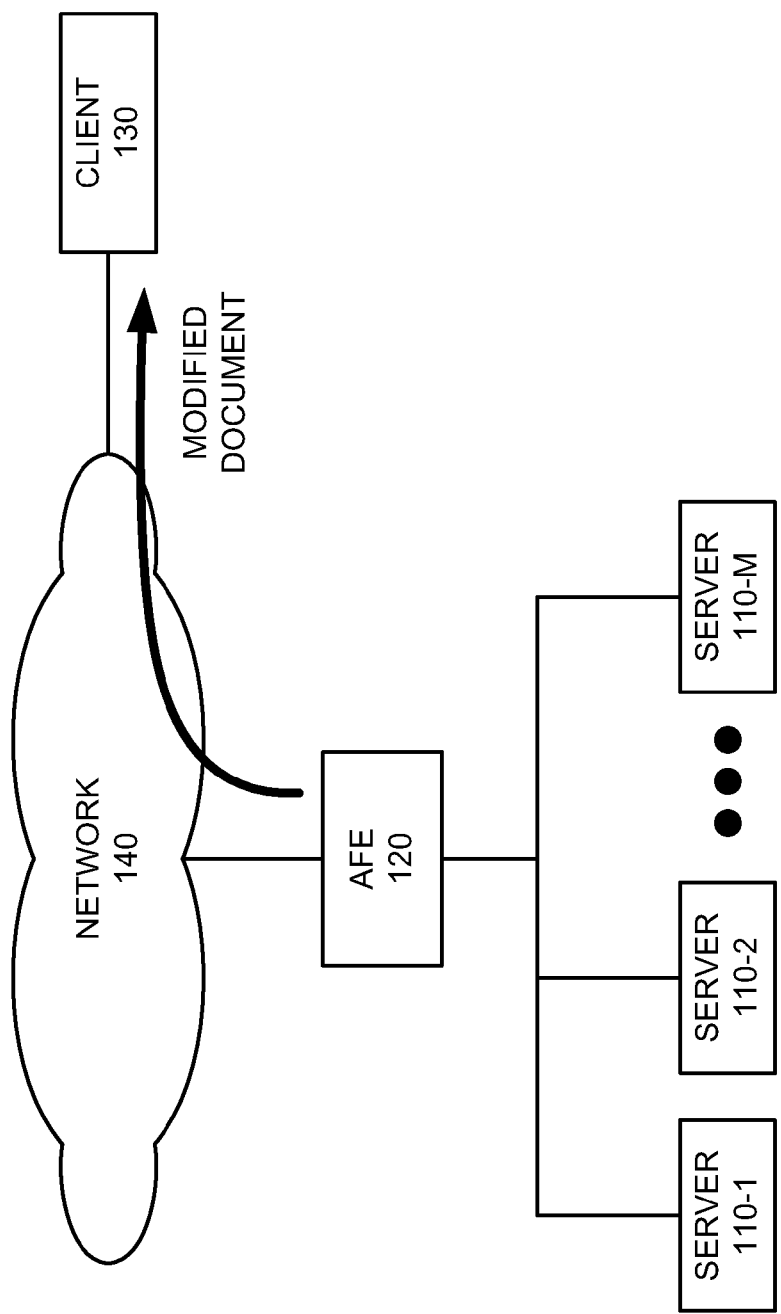

The modified document may be sent to client 130 (block 330) (FIG. 3B). For example, AFE 120 may send the document, which has had its links replaced with links that point to the different hostnames, to client 130, as shown in FIG. 9. Client 130 may process the document. For each unique hostname identified within the document, the browser of client 130 may open two connections (e.g., TCP connections) to download the objects corresponding to the hostnames. In the example described with regard to FIGS. 4-13, the browser of client 130 may open ten connections—two connections for each hostname www1.site.com, . . . , www5.site.com. These extra connections may parallelize much of the downloading of the objects within the document.

Figure 10:
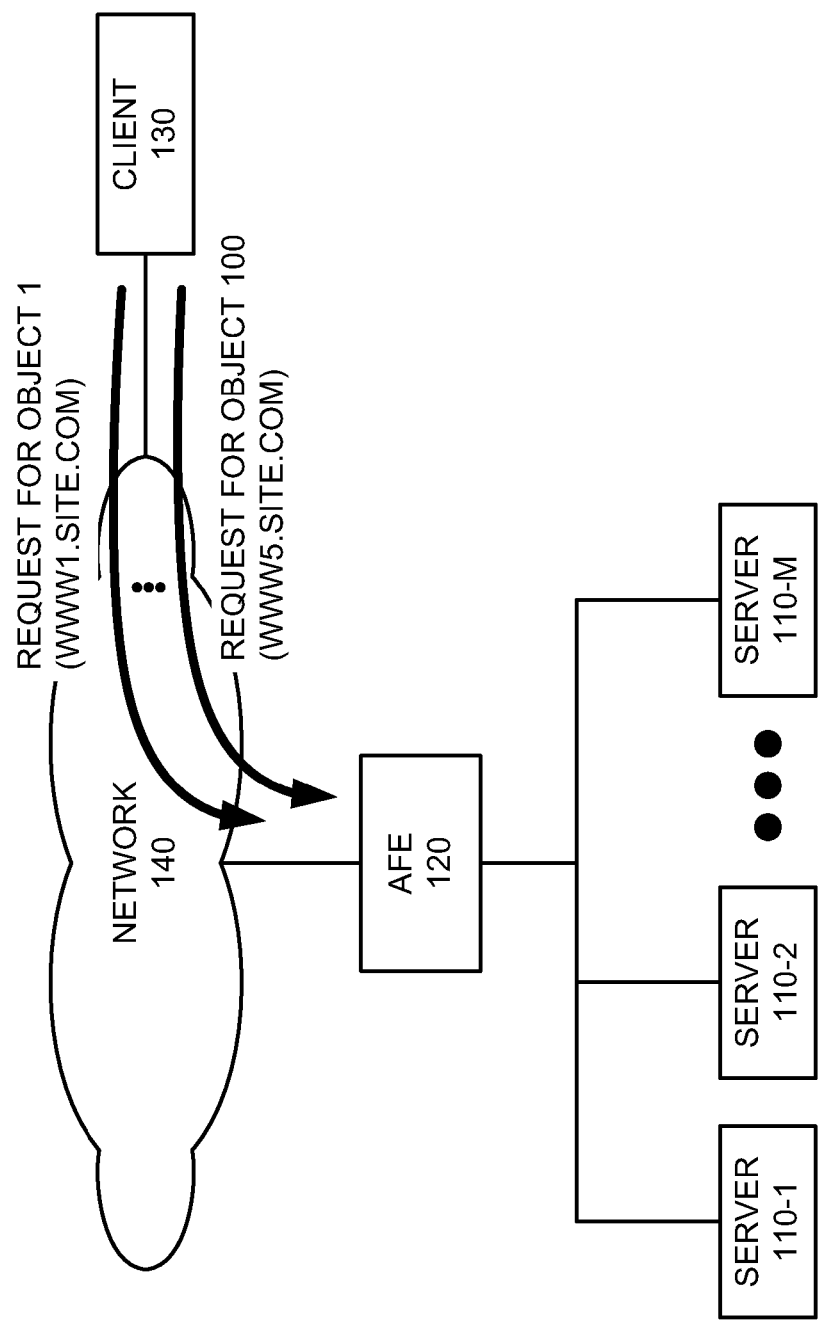

Requests for objects within the document may be received from client 130 (block 335). For example, client 130 may issue a request for each object within the document. Each request may be directed to the hostname associated with the corresponding link. As shown in FIG. 10, the request for object 1 may be directed to www1.site.com, . . . , and the request for object 100 may be directed to www5.site.com.

The requests may be received by network 140. DNS lookups may occur to translate the hostnames www1.site.com, www2.site.com, . . . , www5.site.com into corresponding network addresses (e.g., IP addresses). A DNS server (not shown) connected to network 140 may perform the DNS lookups so that the requests from client 130 can be appropriately routed through network 140. In one implementation, assume that the DNS lookups all result in the same network address (i.e., the network address for AFE 120), as shown in FIG. 10.

The requests may be received by AFE 120 and analyzed to determine where the requests should be sent. For example, AFE 120 may analyze the requests to identify the requests as requests for servers 110. AFE 120 may contain a mapping of hostnames to servers. Assume that AFE 120 maps the hostnames www1.site.com, www2.site.com, . . . , and www5.site.com to the set of servers including servers 110.

Figure 11:
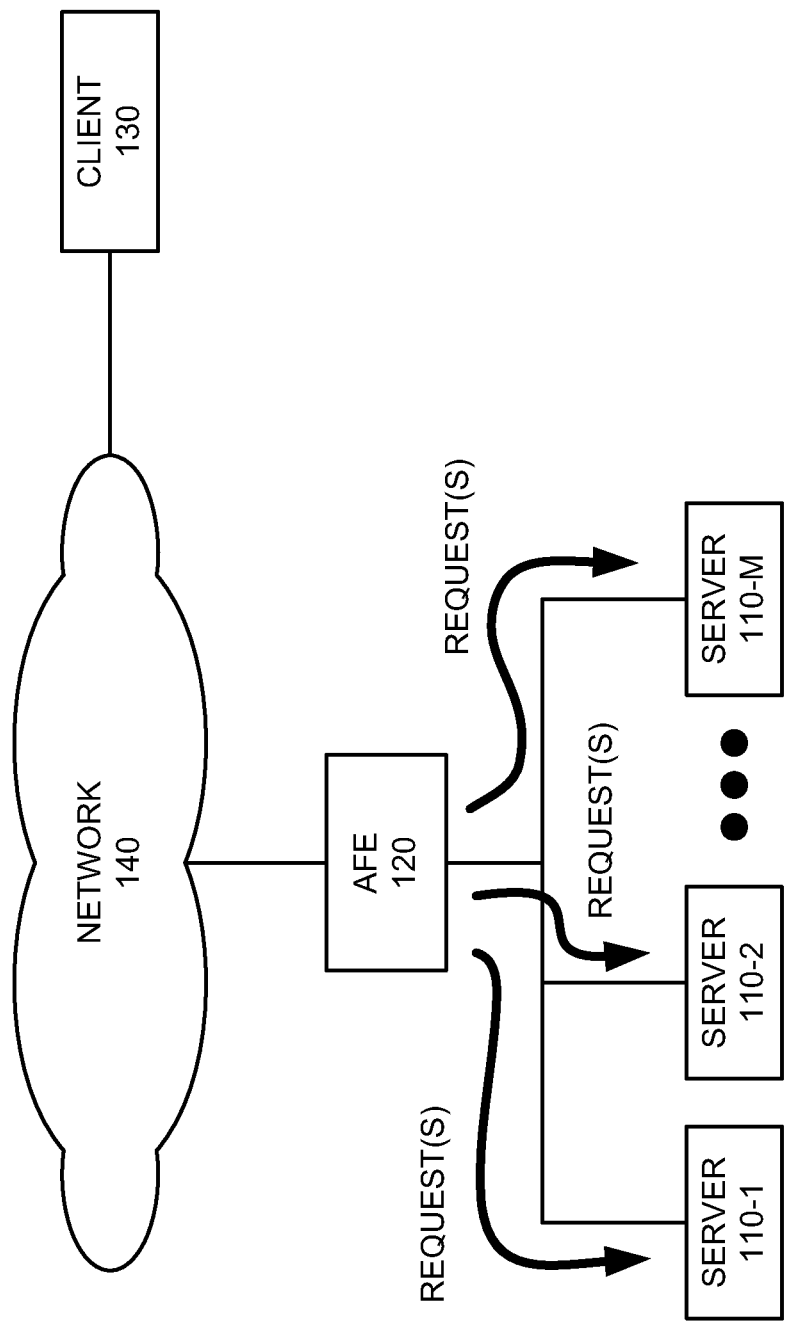

The requests may be distributed to servers 110 (block 340). For example, AFE 120 may send the requests to servers 110, as shown in FIG. 11, according to some rule. In one implementation, AFE 120 may be configured to send the requests according to a load balancing technique, a technique that takes server health into consideration, a technique based on the assigned hostname (e.g., a request for www2.site.com might be given to server 110-2), or according to some other technique that might facilitate handling of the requests.

Figure 12:
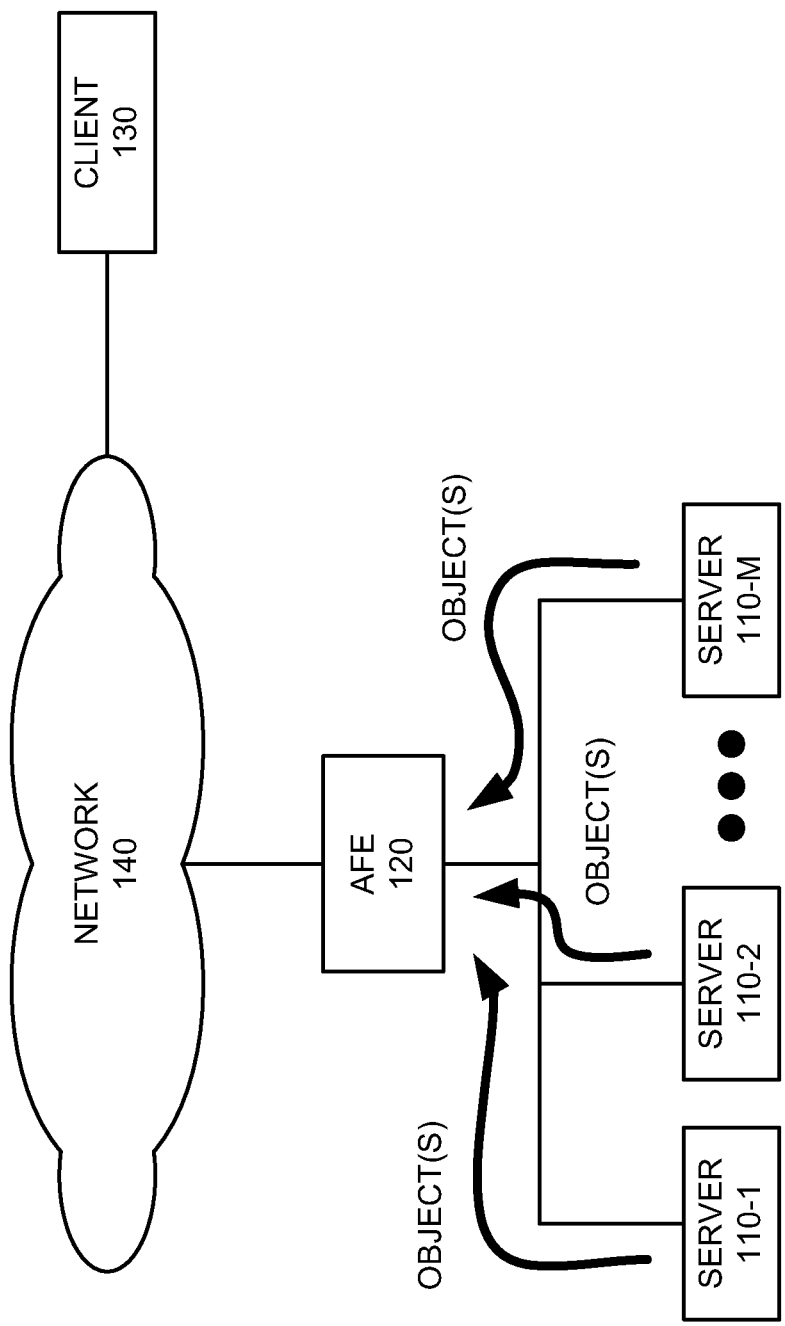
Figure 13:
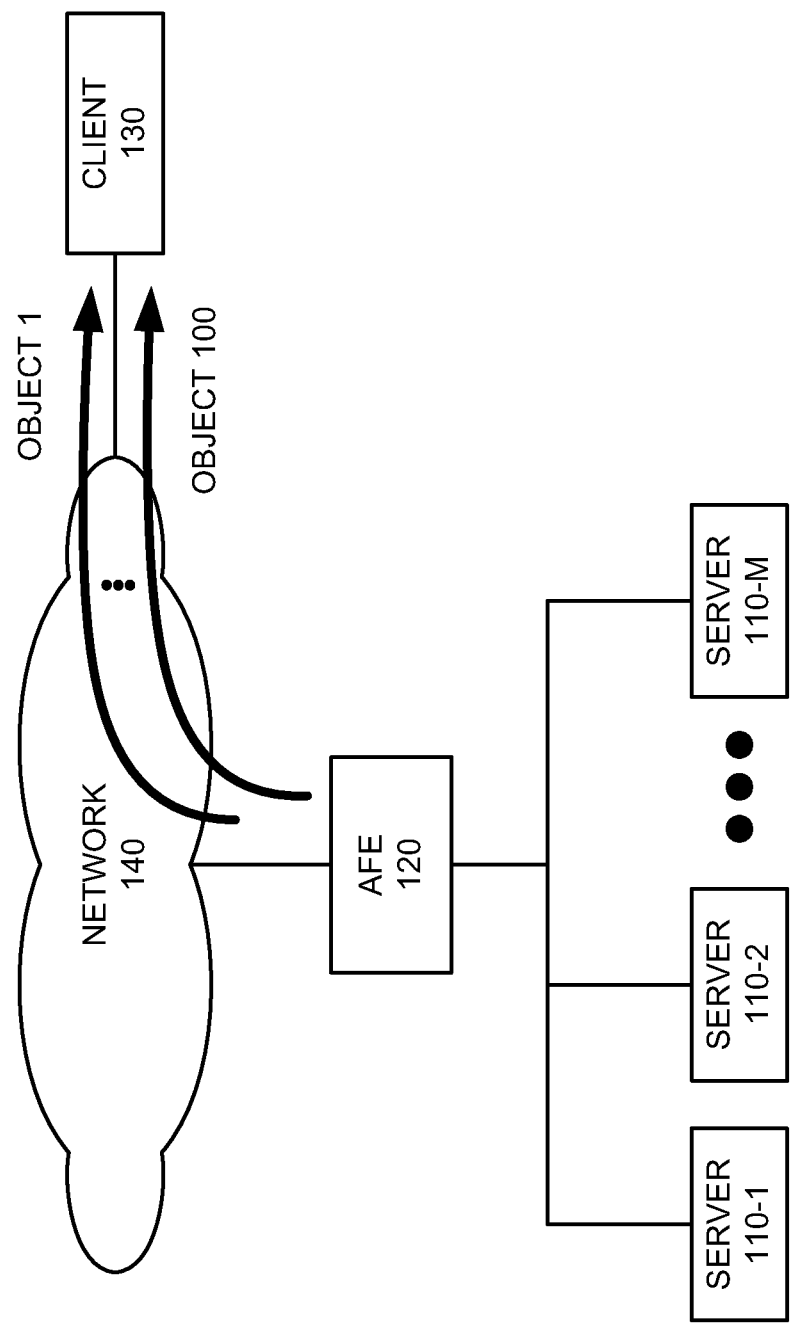

Servers 110 may process the requests and return the requested objects to AFE 120, as shown in FIG. 12. The objects may be received from servers 110 (block 345). AFE 120 may process the objects and identify them for transmission to client 130. The objects may be sent to client 130 (block 350). For example, AFE 120 may send the objects to client 130 via network 140 over the opened connections, as shown in FIG. 13. The browser of client 130 may process the objects so that the document may be rendered on a display associated with client 130.

The dynamic link modification described herein has several advantages. One advantage is that links associated with a particular hostname (e.g., relative links) may be automatically and dynamically rewritten to links associated with a flexible number of different hostnames. This may permit additional connections to be opened than would otherwise be opened, thereby reducing the time it takes to download objects associated with a document.

Another advantage is that the requests for objects may be efficiently processed. For example, the requests may be processed by a group of servers and requests may be distributed to the servers according to a load balancing scheme or a scheme based on server health, thereby improving the handling of the requests.

Other advantages may also be evident to one skilled in the art.

CONCLUSION

Implementations described herein may automatically change the content of a document to cause additional connections to be opened at a web browser, thereby parallelizing much of the downloading of the objects within the document. In these implementations, nothing needs to be done at the web servers. The web servers can continue to operate as usual, processing requests and serving content.

As a result of the implementations described herein, the time it takes to download the objects within a document may be greatly reduced. For example, a document that may previously have taken on the order of twenty-seven seconds to download can be downloaded in a little as four seconds. Download times may be further reduced for documents that have a lot of content, documents that have large file sizes (e.g., 50 kB, 100 kB, or more), or clients with high latency connections.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A and 3B, the order of the acts may differ in other implementations consistent with the principles of the invention. Also, non-dependent acts may be performed in parallel.

Further, while it has been described that the client opens two additional connections for each unique hostname in a document, this need not be the case. In other implementations, the client may open more than two connections for each unique hostname.

Moreover, the preceding description focused on implementations where the identifier is a hostname. As explained above, the identifier may take other forms. For example, when the identifier is an address, AFE 120 may modify links for objects within a document that are associated with a particular hostname to addresses (e.g., IP addresses) that map to a number of different virtual addresses on AFE 120 that are associated with the same group of target hosts (e.g., servers 110). When the identifier is a port number, AFE 120 may modify links for objects within a document that are associated with a particular hostname to a particular virtual address (e.g., a virtual IP address, like 10.10.10.1) with a number of different port numbers (e.g., TCP port numbers, like 10.10.10.1:81, 10.10.10.1:82, . . . , 10.10.10.1:N) that map to AFE 120 and are associated with the same group of target hosts (e.g., servers 110).

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
a memory to store instructions; and
a processor to execute the instructions to:
identify a plurality of first links in a document, where the plurality of first links correspond to a first hostname and where the plurality of first links are associated with objects within the document,
identify a replacement rule associated with the first hostname,
identify a plurality of second hostnames associated with the first hostname, where the plurality of second hostnames differ from the first hostname,
modify the document based on the plurality of second hostnames, where the processor, when modifying the document, is further to:
replace, based on the replacement rule, the plurality of first links in the document with a plurality of second links that are associated with the plurality of second hostnames, and
forward the modified document to a client.

2. The device of claim 1, where the processor is further to:
parse the documents to identify the plurality of first links in the document.

3. The device of claim 1, where, when replacing the plurality of first links, the processor is further to:
replace, in a round robin fashion, the plurality of first links with the plurality of second links, when a quantity of the plurality of first links exceeds a quantity of the plurality of second hostnames.

4. The device of claim 1, where the processor is further to:
receive, from the client, requests for the objects, where each of the requests includes one of the plurality of second hostnames; and
distribute the requests for the objects to multiple servers associated with the first hostname according to a load balancing and based on respective health of the multiple servers.

5. The device of claim 4, where each unique one of the plurality of second hostnames in the document forwarded to the client causes the client to open a plurality of connections; and
the processor is further to:
send the objects to the client over the plurality of connections, where the plurality of connections are transmission control protocol (TCP) connections.

6. A method, comprising:
   receiving, by a server, a document that includes a plurality of first links for a corresponding plurality of objects within the document, where each of the plurality of first links is associated with one or more first hostnames;
   automatically modifying, by the server, the plurality of first links in the document to second links that include a plurality of different second hostnames that differ from the one or more first hostnames, where a quantity of second hostnames exceeds a quantity of first links and where automatically modifying the plurality of first links includes replacing, in the plurality of first links, the one or more first hostnames with the plurality of second hostnames; and
   transmitting, by the server, the document with the plurality of second links to a client.

7. The method of claim 6, further comprising:
   parsing code or text associated with the document to identify the plurality of first links in the document.

8. The method of claim 6, where automatically modifying the plurality of first links further includes:
   receiving information regarding a total quantity of connections desired to be opened at the client,
   determining a quantity of different hostnames to use based on the received information, and
   replacing the plurality of first links with the plurality of second links that include the different hostnames based on the determined quantity of different hostnames.

9. The method of claim 6, where automatically modifying the plurality of first links further includes:
   replacing the plurality of first links with the plurality of second links that include the plurality of second hostnames based on a set of rules associated with the one or more first hostnames.

10. The method of claim 6, further comprising:
    receiving, from the client, requests for the plurality of objects, where each of the requests includes one of the plurality of second hostnames.

11. The method of claim 10, where the document is hosted by a plurality of servers, and where the method further comprises:
    distributing the requests for the plurality of objects to the plurality of servers.

12. The method of claim 11, where distributing the requests for the plurality of objects includes:
    sending the requests to the plurality of servers based on a load balancing technique and based on respective health of the plurality of servers.

13. The method of claim 11, where each unique one of the plurality of second hostnames, in the document transmitted to the client, causes the client to open a plurality of connections; and
    where the method further comprises:
    sending the plurality of objects to the client over the plurality of connections.

14. A non-transitory computer-readable medium device to store instructions that are executable on a computer device, the instructions comprising:
    one or more instructions to identify a plurality of first links in a document, the plurality of first links corresponding to a plurality of objects within the document and associated with a first hostname;
    one or more instructions to replace the plurality of first links in the document with a plurality of second links that are associated with a plurality of different second hostnames that differ from the first hostname; and
    one or more instructions to forward the document including the plurality of second links to a client.

15. The non-transitory computer-readable medium of claim 14, where the instructions further comprise:
    one or more instructions to receive a request for the document from the client,
    one or more instructions to forward the request to a server, and
    one or more instructions to receive the document from the server based on the request.

16. The non-transitory computer-readable medium of claim 14, where the document includes code or text, and where the instructions further include:
    one or more instructions to parse the code or text to identify the plurality of first links in the document.

17. The non-transitory computer-readable medium of claim 14, where the instructions further comprise:
    one or more instructions to receive information regarding a total quantity of connections desired to be opened at the client;
    one or more instructions to determine a quantity of different hostnames to use based on the received information; and
    one or more instructions to modify the plurality of first links into the plurality of second links based on the determined quantity of different hostnames.

18. The non-transitory computer-readable medium of claim 14, where the one or more instructions to replace the plurality of first links include:
    one or more instructions to modify the plurality of first links with the plurality of second links based on a set of rules.

19. The non-transitory computer-readable medium of claim 14, where the instructions further include:
    one or more instructions to receive, from the client, requests for the plurality of objects, where each of the requests includes one of the plurality of second hostnames.

20. The non-transitory computer-readable medium of claim 19, where the document is hosted by a plurality of servers, and where instructions further include:
    one or more instructions to distribute the requests for the plurality of objects to the plurality of servers based on to at least one of load balancing or health of the servers.

* * * * *